Patented Feb. 4, 1947

2,415,394

UNITED STATES PATENT OFFICE 2,415,394

PROCESS OF PREPARING ZINC YELLOW PIGMENTS

Omar F. Tarr, Stoneleigh, and Marc Darrin, Baltimore, Md., assignors to Mutual Chemical Company of America, New York, N. Y., a corporation of New Jersey No Drawing. Application July 23, 1941,
Serial No. 403,707

7 Claims. (Cl. 23—56)

This invention relates to zinc yellow or zinc chrome pigments having valuable corrosion inhibiting properties. The invention includes new zinc yellow or zinc chrome pigments as well as a new process by which these pigments may be produced. It includes also a new basic potassium zinc chromate hydrate in the form of very small crystals belonging to the triclinic system.

The ordinary method of making zinc chrome or zinc yellow pigments is to react a suspension of zinc oxide in warm water with sulfuric acid so as to form a basic zinc sulfate. To this reaction mixture is added a solution of potassium bichromate, or a mixture of sodium bichromate and a potash salt. This results in the formation of a slurry or suspension of a slightly soluble double chromate of potassium and zinc together with some unreacted or partially-reacted zinc oxide in an aqueous solution of sulfates and unreacted bichromate. Part of the sulfate may be removed by washing but it has been impossible to remove all of it since a substantial amount is chemically combined in the precipitate formed by the reaction. It is often desirable to keep the sulfate content of the zinc yellow pigments as low as possible so that the corrosion-inhibiting properties of the pigment will not be impaired.

Modifications of the process just described have also been proposed, but in general they result in the production of pigments containing substantial quantities of impurities including sulfates. Among the variants which have been proposed are the use of zinc salts or metallic zinc in place of zinc oxide; also the use of zinc oxide dissolved in excess chromic acid and then precipitated as the double chromate with an excess of caustic potash. The latter procedure requires the use of large excesses of reactants and is quite uneconomical. Furthermore it gives pigments which are frequently dense or even coarsely granular with an undesirable red hue.

The new zinc yellow pigments of this invention comprise water and the oxides of zinc, hexavalent chromium and alkali metal or its equivalent, in combined form. They are substantially free from sulphates and accordingly have very desirable corrosion-inhibiting properties. Where corrosion-inhibiting properties are not so essential they may contain a small percentage of sulphates, e. g. less than 1.2% calculated as $SO_3$.

The new pigments have good tinting strength, good working properties in oil, etc. Such pigments may be readily prepared by the new process of this invention. This process has important advantages from an economic standpoint, since it results in the substantially complete utilization of the chemical reactants employed, so that there is practically no loss of chromium, zinc or other compounds.

In accordance with the process of this invention, zinc yellow pigments are produced by reacting zinc oxide and an alkali metal tetrachromate e. g. potassium tetrachromate, in substantially the same relative proportions present in the pigment which it is desired to produce. For example, in the production of a pigment corresponding to the formula $K_2O \cdot 4ZnO \cdot CrO_3 \cdot 3H_2O$, zinc oxide and potassium tetrachromate are reacted in the proportions of 4 molecular equivalents of zinc oxide and one molecular equivalent of potassium tetrachromate.

In practicing the process of the invention an aqueous slurry or suspension of zinc oxide is treated with a solution of an alkali metal tetrachromate, the proportion of the reactants being substantially as indicated above. When the resulting reaction is substantially complete the precipitated alkali metal zinc chromate is filtered off and dried. The resulting product is a zinc chrome pigment substantially free from sulfates or other impurities.

Due to the equilibrium conditions in the reaction, the slight solubility of the alkali metal zinc chromate and related factors it is advantageous to use a small excess of alkali metal chromate, or its equivalent in the form of alkali metal oxide and chromic acid. This may be accomplished with advantage by using the filtrate from a prior batch of pigment. Such a filtrate contains traces of zinc oxide and small amounts of alkali metal oxide and chromic acid in combined form, and is substantially free from impurities. The reuse of this filtrate to prepare subsequent batches results in the practice of the process with substantially no loss of chemicals. By practicing the process in this manner yields exceeding 99% of the theoretical may be obtained.

When the presence of a small amount of sulfate in the pigment is not objectionable, the process may be modified by substituting for a part of the chromic acid present in the tetrachromate an equivalent amount of sulfuric acid. Thus, for example, a tetrachromate solution may be prepared by dissolving potassium bichromate and chromic acid in water, and in the modified procedure a part of this chromic acid is replaced by sulfuric acid. This modified procedure may result in the formation of some potassium sulfate in the filtrate, for which suitable precautions should be taken if it is used in subsequent batches.

In another modification of the process a part of the chromic acid is replaced by an equivalent amount of sodium bichromate plus an amount of sulfuric acid equivalent to the soda in the sodium bichromate. In practicing this modification of the process it is advantageous to add the sulfuric acid to the zinc oxide reaction mixture after the addition of the potassium and sodium bichromate. This is because the sulfuric acid serves to liberate free chromic acid from the bichromate, it is not a reactant for the zinc oxide as in the ordinary process. Because of the formation of considerable sodium sulfate in the filtrate, this modification of our process is not suited for reusing the filtrate in subsequent batches.

The invention will be illustrated by the following examples but it is not limited thereto.

Example 1

A sulfate-free, zinc yellow pigment is produced by emulsifying or suspending 186 pounds of zinc oxide in 120 gallons of hot water. The mixture is stirred and heated. The zinc oxide swells and as the swelling of the oxide continues additions are made of the filtrate from a prior batch of pigment until the volume of the zinc oxide emulsion or suspension is about 300 gallons. The time required for this operation may be about 2 hours and the temperature during this period is maintained at about 60° C.

At this stage the potassium tetrachromate solution is added to the swelled zinc oxide suspension. This tetrachromate solution is prepared by dissolving about 168 pounds of potassium bichromate and 115 pounds of chromic acid in about 120 gallons of the hot filtrate from a prior pigment batch. The filtrate may be concentrated by evaporation in order to obtain the proper volume relations or water may be added if necessary. After the addition of the tetrachromate to the zinc oxide suspension, stirring is continued while the temperature is maintained at about 50 to 60° C. Due to the reaction between the tetrachromate and the zinc oxide the temperature may rise about 10° when the tetrachromate solution is first added. Stirring and heating are continued for about four hours and during the course of this period the color of the reaction mixture changes from a dull orange to a bright pure yellow. The heating is then stopped but stirring is continued until the pH of the reaction liquid tests about 6.7 to 7.4. This may require about ten hours.

The light pure yellow precipitate of hydrated potassium zinc chromate is then filtered off and the liquid in the filter cake displaced with a small quantity of water. The wet filter cake may be dried at a temperature of about 110° C. and then disintegrated in the customary manner. The product is in condition suitable for general use such as, for example, in paints, inks and corrosion inhibitors. The yield of the finished pigment is about 497 pounds or 99% of the theoretical on the basis of the zinc oxide originally introduced. The new pigment is free from sulfates and corresponds to the chemical formula

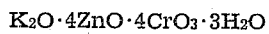

$$K_2O \cdot 4ZnO \cdot 4CrO_3 \cdot 3H_2O$$

A comparison of the analysis of the new pigment with the percentage composition indicated by the formula $K_2O \cdot 4ZnO \cdot 4CrO_3 \cdot 3H_2O$ appears below:

|  | Calculated | Found |
| --- | --- | --- |
|  | Per cent | Per cent |
| $K_2O$ | 10.8 | 10.7 |
| $ZnO$ | 37.2 | 37.3 |
| $CrO_3$ | 45.8 | 45.4 |
| $H_2O$ | 6.2 | 6.5 |
|  | 100.0 | 99.9 |

It is apparent from the foregoing that the new pigment is substantially pure

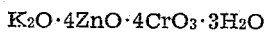

$$K_2O \cdot 4ZnO \cdot 4CrO_3 \cdot 3H_2O$$

Microscopic studies indicate that the product is in the form of very small microscopic and submicroscopic triclinic crystals, pinocoidal class. Larger crystals have been prepared and separated by a special laboratory technique, and analyze the same as the new pigment.

Example 2

The process of Example 1 may be modified by replacing about 18.8 pounds of the chromic acid used in preparing the potassium tetrachromate with about 19.4 pounds of 66° Bé. sulfuric acid. The process is carried out in the same manner as in Example 1 (except for recirculation of the filtrate) and results in the production of a slightly sulfated pigment containing about 1.19% of $SO_3$.

The temperatures and periods of stirring referred to in the above examples may be varied. Likewise, the potassium bichromate, chromic acid, or other reactants may be added separately to the zinc slurry. The concentration of the solutions or suspensions may be varied. The actual proportions of the various reactants are varied in accordance with the composition of the ultimate pigment which it is desired to produce. For example, to produce a zinc yellow corresponding to the formula $K_2O \cdot 3ZnO \cdot 4CrO_3$, three molecular equivalents of zinc oxide will be reacted with one molecular equivalent of potassium tetrachromate.

Sodium zinc chromates may be prepared by substantially the same procedure as is set forth in Example 1. However, due to the greater solubility or a difference in the equilibrium of the sodium compounds of zinc and chromic acid, the reaction mixtures advantageously contain a larger excess of the soluble reactants than is the case with the potassium compound. In order to avoid losses this excess of reactants may be introduced into the reaction by a recirculation procedure in a manner similar to that described in connection with the preparation of the potassium salt. In preparing the sodium salts the pH at the end of the reaction may be somewhat lower than that used in Example 1 in the preparation of the potassium compound. Basic ammonium zinc chromates may be prepared in an analogous manner.

Good grades of zinc oxide swell quickly in warm water, and while in this state react with the potassium tetrachromate in a very satisfactory manner. Poor grades are less reactive and swell more slowly, but their rate of swelling and reactivity may be accelerated by the introduction of a small amount of caustic alkali into the zinc oxide slurry or suspension before its admixture with the tetrachromate. Thus, for example, in the process as described in Example 1, about 6.7 pounds of caustic potash may be added to the zinc oxide suspension.

To adjust the pH of the reaction mixture near the end of the reaction, it is sometimes desirable to introduce a small amount of alkali or chromic acid.

The new pigment compositions of this invention may be modified by the incorporation of alkaline earth oxides such as calcium or magnesium oxide, or they may be compounded with varying amounts of other pigment materials such as, for example, lead compounds, to produce composite pigments. Various zinc chromates, containing little or no alkali, may also be prepared by suitable modification of the process.

We claim:

1. The process of preparing zinc yellow pigments, which comprises reacting an aqueous suspension of zinc oxide and a solution of alkali metal tetrachromate, with substantially no excess of either reactant, and separating the precipitated pigment from the aqueous medium, said pigment containing substantially all the component parts of the reactants, chemically combined, as a single reaction product, there being substantially no other products formed by the reaction, and there being present no other reactants.

2. The process as defined in claim 1, wherein the solution of alkali metal tetrachromate contains a slight excess of alkali metal oxide over stoichiometric proportions.

3. The process as defined in claim 1, wherein the alkali metal tetrachromate is potassium tetrachromate.

4. The process as defined in claim 1, wherein the alkali metal tetrachromate is potassium tetrachromate, and wherein the solution of said tetrachromate contains a slight excess of potassium oxide over stoichiometric proportions.

5. The process as defined in claim 1, conducted in an aqueous medium containing filtrate from a previous batch of said pigment.

6. The process of preparing zinc yellow pigments, which comprises reacting an aqueous suspension of zinc oxide with alkali metal bichromate and chromic acid in the approximate molar proportions of 4:1:2, with substantially no excess of any reactant, and separating the precipitated pigment from the aqueous medium, said pigment containing substantially all the component parts of the reactants, chemically combined, as a single reaction product, there being substantially no other products formed by the reaction, and there being present no other reactants.

7. The process as defined in claim 6 in which the alkali metal bichromate is potassium bichromate.

OMAR F. TARR.
MARC DARRIN.

REFERENCES CITED

The following references are of record in the file of this patent:

UNITED STATES PATENTS

| Number | Name | Date |
| --- | --- | --- |
| 2,340,716 | Van Wirt, et al. | Feb. 1, 1944 |

OTHER REFERENCES

Hurst's "Painters' Colours, Oils and Varnishes," 1892, pp. 129–131. (Copy in Patent Office Library.)

Riskin, part I, Zn Prikl. Khim xii, 1939, No. 5, page 686; part II, ibid, No. 11, page 1681.

Mattiello, "Protective and Decorative Coatings," vol. 11, 1942, pages 380–381.

Thorpe, "Dictionary of Applied Chemistry," vol. II, 1912. (Copy in Scientific Library), page 59.

Mellor, "A Comprehensive Treatise on Inorganic and Theoretical Chemistry," vol. XI, page 279.

Behr, "Zinc Chromate Pigments" in Paint, Etc. (Copy in Scientific Library), pages 157–161.

Mellor, "Comprehensive Treatise on Inorganic & Theoretical Chemistry," vol. XI, page 352. (Copy in Division 59.)

Riskin et al., An. Prikl. Khim, 1939, vol. 12, pp. 1780–1785, "Investigation of the Conditions of Obtaining Chromate of Zinc." (Translation of Article in Div. 59), 23–56.